United States Patent
Kircher et al.

[11] 3,797,517
[45] Mar. 19, 1974

[54] SELF-PROPELLED IRRIGATION APPARATUS

[75] Inventors: Robert J. Kircher; Richard D. Setty, both of Sterling, Colo.

[73] Assignee: Sterling Square Sprinkler Company, Inc., Sterling, Colo.

[22] Filed: Oct. 24, 1972

[21] Appl. No.: 300,426

[52] U.S. Cl. .............................. 137/344, 239/212
[51] Int. Cl. ......................... B05b 9/02, E01h 3/02
[58] Field of Search ........... 137/344; 239/212, 213, 239/189, 196

[56] References Cited
UNITED STATES PATENTS

| | | | |
|---|---|---|---|
| 2,941,727 | 6/1960 | Zybach | 239/212 X |
| 3,352,493 | 11/1967 | Curtis | 239/212 X |
| 3,537,470 | 11/1970 | Cornelius | 137/344 |
| 3,608,826 | 9/1971 | Reinke | 137/344 |
| 3,623,662 | 11/1971 | Reinke | 239/213 X |
| 3,703,990 | 11/1972 | Erickson | 137/344 X |
| 3,726,478 | 4/1973 | McMurray | 137/344 X |
| 3,750,953 | 8/1973 | Reinke | 137/344 X |

*Primary Examiner*—Samuel Scott
*Attorney, Agent, or Firm*—Darby & Darby

[57] ABSTRACT

Self-propelled irrigation apparatus for watering non-circular areas includes a main arm assembly pivoted at one end and supported at intervals by self-propelled support towers. An extension arm assembly, mounted on self-propelled support towers having steerable wheels, has one end pivotally connected to the free end of the main arm assembly for irrigating portions of the field outside the circular area traversed by the main arm. Electrical control means are provided to rotate the extension arm assembly relative to the main arm assembly as the latter rotates by turning the steerable wheels of the extension arm. The control means comprises a reversible motor energized by a circuit including banks of switches, the settings of which correspond, respectively, to the angular position of the main arm and the direction in which the steerable wheels are turned.

4 Claims, 10 Drawing Figures

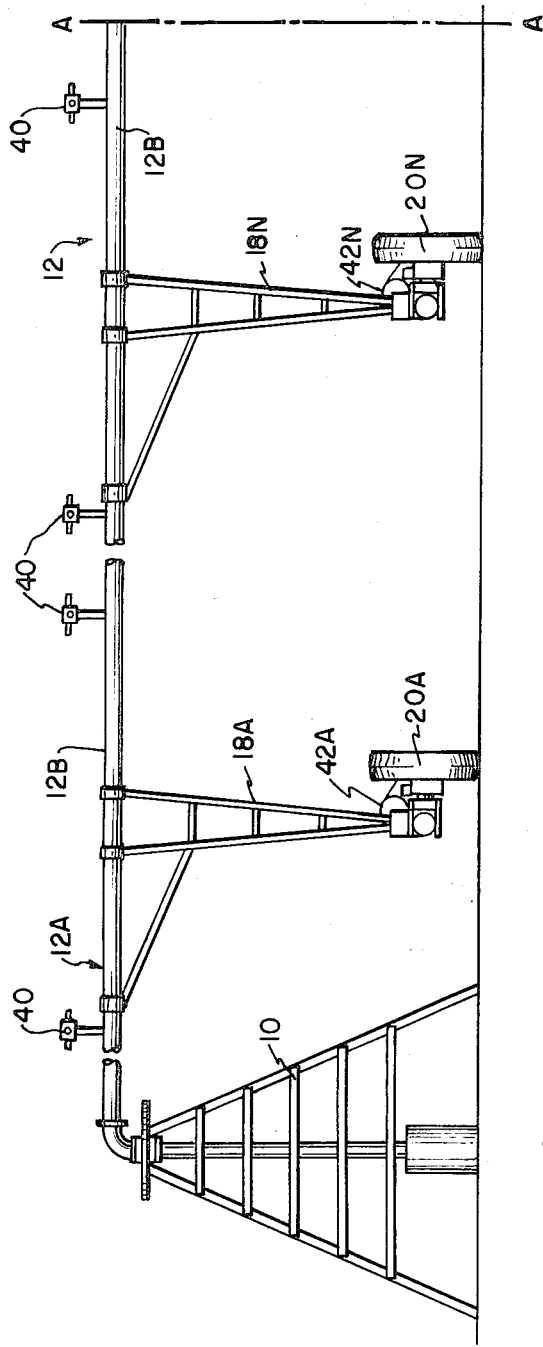
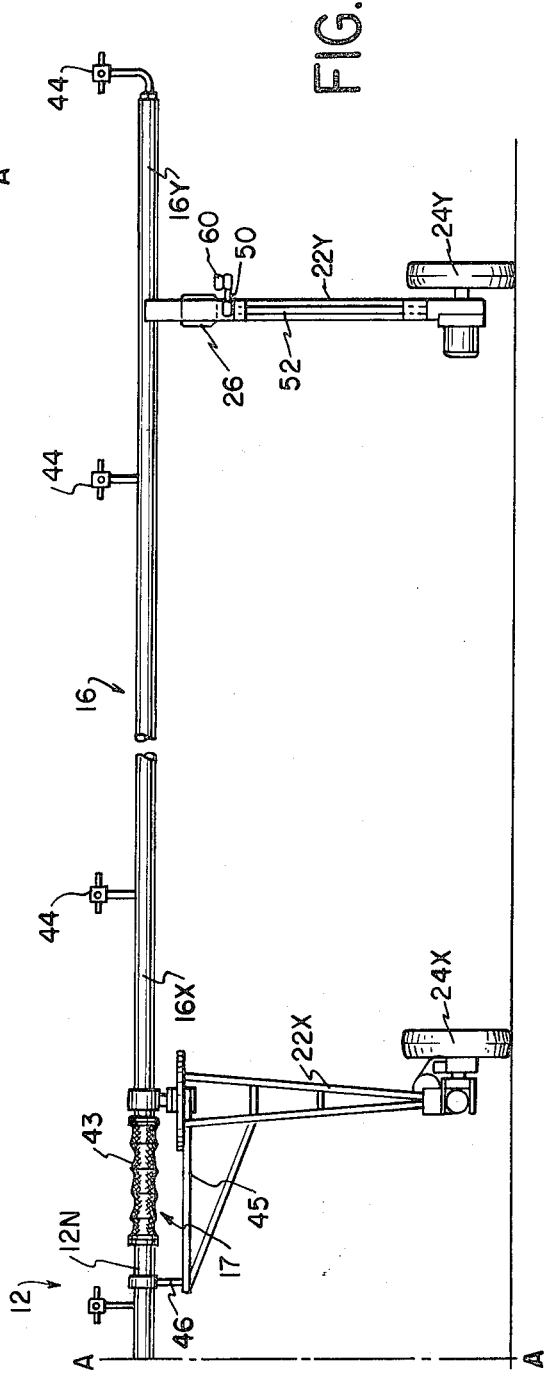

FIG. 8A
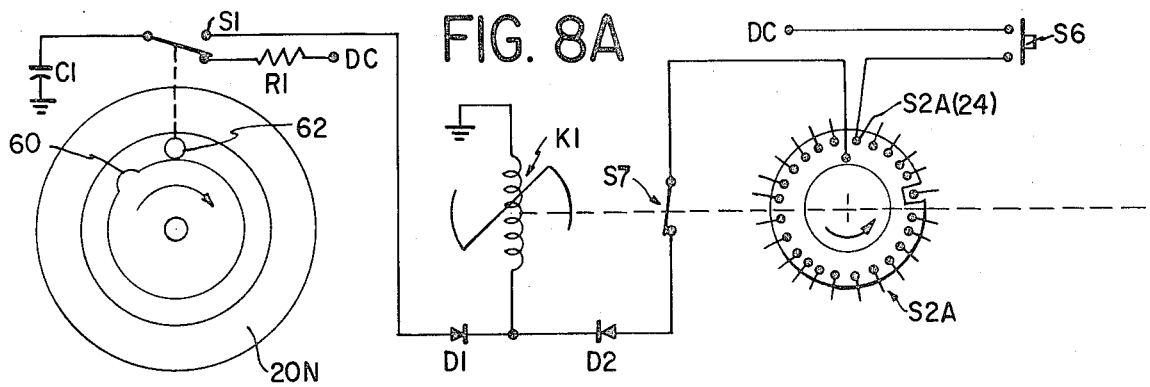
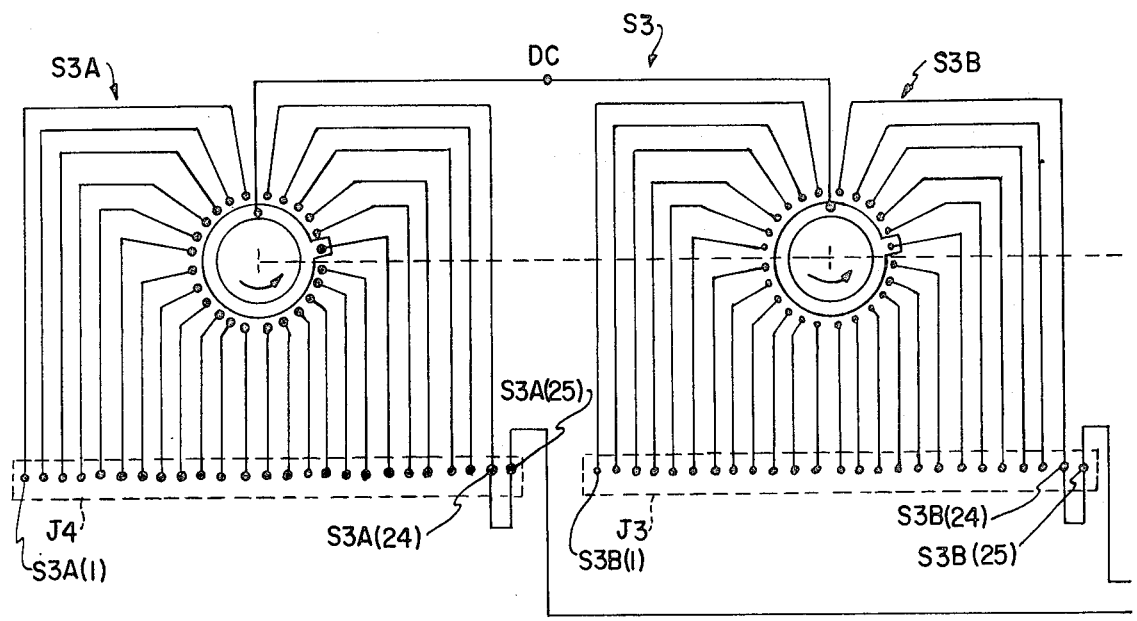

3,797,517

SELF-PROPELLED IRRIGATION APPARATUS

This invention relates generally to irrigation apparatus, and, more particularly, to self-propelled irrigation apparatus of the center pivot type.

One popular manner of irrigating crops is through sprinkler irrigation. Of the various types of sprinkler apparatus, it has been found that the self-propelled, center pivot irrigation apparatus is the most effective type for irrigating large sections of land economically and in a uniform manner. Self-propelled irrigation apparatus of the center pivot type comprises an elongated main arm assembly, usually including several sections connected at their ends, supported at intervals by self-propelling wheeled support towers. The main arm assembly supports, or may itself constitute, a fluid carrying conduit and includes a large number of sprinklers or nozzles spaced along its length. One end of the assembly is pivotally coupled to a base and water supplied to the conduit is discharged from the sprinklers as the assembly rotates around the base, thereby uniformly irrigating a section of land.

One problem inherent in the use of such devices is that the irrigated section necessarily takes the form of a circle (with the arm as its radius). Thus, the use of a center pivot type irrigation apparatus within a square section of land will result in a substantial portion of the land (outside that circle) remaining un-irrigated. It has been estimated that such systems fail to cover 21.4 percent of the potentially agriculturally productive area of a square field.

One method of attacking this problem has been to provide fluid discharge means, such as a water gun at the end of the arm assembly facing radially outwardly. Water is discharged through this gun when it faces the un-irrigated portions of the land. Such systems have not proved to be entirely adequate, however, since only a relatively narrow additional arc of land can be irrigated, and, moreover, these water-guns expel large droplets of water which can cause damage to delicate crops.

U.S. Patent Application Ser. No. 306545, filed on Nov. 15, 1972, in the names of David Seckler and David Porat, and entitled "Irrigating Apparatus", discloses irrigating apparatus capable of irrigating sections of a field outside the circular area traversed by the main arm assembly of a center pivot irrigating apparatus. That invention avoids, or substantially minimizes, the drawbacks associated with known water-gun systems for accomplishing this objective, yet it is simple and relatively inexpensive. A particular advantage of that invention is that it may be readily incorporated into existing center pivot irrigation systems so that replacement of these costly systems is not required.

The present invention is an improvement over the basic invention of Application No. 306545, in that it provides a control system for the extension arm assembly which is simpler and more reliable in operation under the field conditions which the system is likely to encounter.

Briefly, in accordance with the invention, an extension arm is mounted at the free end of a main arm assembly which rotates about a center pivot. The extension arm carries sprinklers which irrigate areas outside of the circular area covered by the main arm assembly, and rotates with respect to the main arm assembly to control the areas which it (the extension arm) covers. The extension arm is moved by steerable wheels operated by a reversible motor under the control of an electro-mechanical switching circuit which compares the angle of the main arm with the position of the steerable wheels.

The invention is described in detail below with reference to the annexed drawings, wherein:

FIGS. 4A and 4B are front views of the main arm assembly and extension arm assembly, according to Application No. ;

FIGS. 8A and 8B show the preferred embodiment of this invention.

Figure 1:
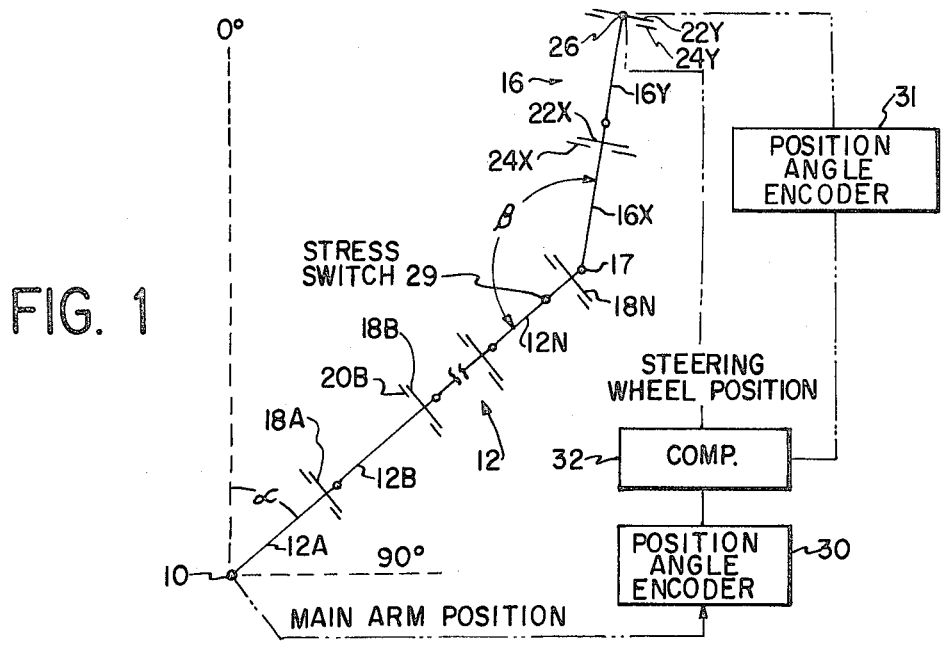
FIG. 1 is a diagrammatic illustration of the basic system as disclosed in Application No. 306545.

The basic operation of the system is explained with reference to FIG. 1. The main arm assembly, shown generally at 12, includes a plurality of separate sections 12A, 12B...N, which are colinearly aligned. The extension arm is shown at 16 and, for example, may include two sections 16X and 16Y. The extension arm section 16X is pivotally mounted at 17 to the outer or free extremity of the main arm section 12N.

Each of the main arm sections 12A,B...N is supported on a respective support tower 18A,B...N, on which pairs of wheels 20A,B...N are mounted. The extension arm sections 16X and 16Y are supported on towers 22X and 22Y which contain respective pairs of wheels 24X and 24Y. The constructions of the support towers 18 and 22 are identical except that the wheels 24X and 24Y are steerable. In practice, a single steering motor shown diagrammatically at 26 may be used to control the wheels 24Y with the wheels 24X being allowed to follow the wheels 24Y either passively or with a power assist.

Water is supplied to the main arm assembly 12 and the extension arm assembly 16 both of which include sprinkler devices to distribute the water over the length of these arms. The main arm assembly may, for example, be 1,200 feet in length and require anywhere from 24 to 72 hours to rotate 360°.

Obviously, the main arm assembly 12, which may be considered to be fixed in length, is only capable of covering a circular area of the field. The extension arm assembly 16, when pivoted about point 17, permits irrigation of a section of the field outside of this circular area. By controlling the position of the arm 16 with respect to the main arm 12 (represented by the angle β), it is possible to irrigate non-circular areas so that in many cases an entire field can be fully irrigated.

Conventionally, irrigating apparatus of the type disclosed is self-propelled in the sense that each pair of wheels 20A, 20B...N, is driven by a motor (not shown in FIG. 1), for example, a constant speed electric motor. For purposes of explanation, the angular position of the main arm assembly 12 may be represented by the angle α (FIG. 1). If it is desired to irrigate a square field, $\beta$ should vary from 90° (at $\alpha = 0°$) to its maximum when $\alpha = 45°$ and back to 90° when $\alpha = 90°$. This pattern repeats for each of the successive quadrants in the case of a square field. For purposes of mechanical stability, it is generally desirable that the maximum value of $\beta$ be less than 180°, for example, 140°.

As noted previously, the main extension arm consists of a series of sections 12A,B...N, which are joined at flexible joints. In prior art constructions, where there is no extension, the driving motor for the outermost support tower 18N is driven continuously. A microswitch is placed at the joint between the outermost section 12N and the next adjacent section. When the microswitch is actuated because of stress at the joint caused by movement of the outermost section 12N, the motor for this next section is actuated.

Similarly, movement of the second section actuates a microswitch at the junction of the second and third sections to operate the driving motor for the third section, and so forth for each of the remaining sections. Each of the motors drives its associated support wheels at the same rate of speed and, consequently, since the outermost section 12N travels at the highest rate of speed, the inner sections would be operated intermittently with the innermost section operating over the shortest periods. The system is relatively simple and inexpensive since constantspeed motors, all of which are the same, can be used and special gear reduction units are not required for the individual sections.

According to the preferred embodiments of the invention, the system is controlled by movement of the extension arm rather than the outermost section of the main arm. The drive motor for tower 18N is not continuously operated, but instead, is controlled by a stress switch shown diagrammatically at 29 in FIG. 1.

A position angle encoder 30 is located at the base 10 for the main extension arm 12. The encoder 30 may be an analog to-digital device which coverts the angle $\alpha$ to a five-bit digital signal. A similar position angle encoder 31 is physically located at the support tower 22Y for the steering wheels 24Y, and also produces a five-bit digital signal representing the position angle of the steering wheels of the extension arm with respect to an arbitrarily selected reference angle (e.g. perpendicular to arm 16).

The two digital signals from the encoders 30 and 31 are coupled to an electrical comparator 32 which produces an electrical control signal when the two digital signals are not equal (or have any other preselected relationship). This electrical signal is coupled to the steering motor 26 which causes the wheels 24Y (and 24X) to turn until the encoded digital output representing the steering wheel position is equal (or otherwise corresponds) to the output from the main arm position angle encoder 30. At this position, the steering motor 26 is deactivated and the extension arm continues to rotate with the steering wheels in a fixed position.

As the extension arm 16 rotates, a position is reached where the stress on the main extension arm section 12N causes the stress switch 29 to be actuated. When switch 29 is actuated, it energizes the driving motor for the wheels on the main section 12N which then causes this section of the main extension arm to start moving. In a similar way, as described in the foregoing, the movement of this outer main section successively operates the drive motors associated with the remaining interior sections so that the main extension arm sweeps across the field.

Figure 2:
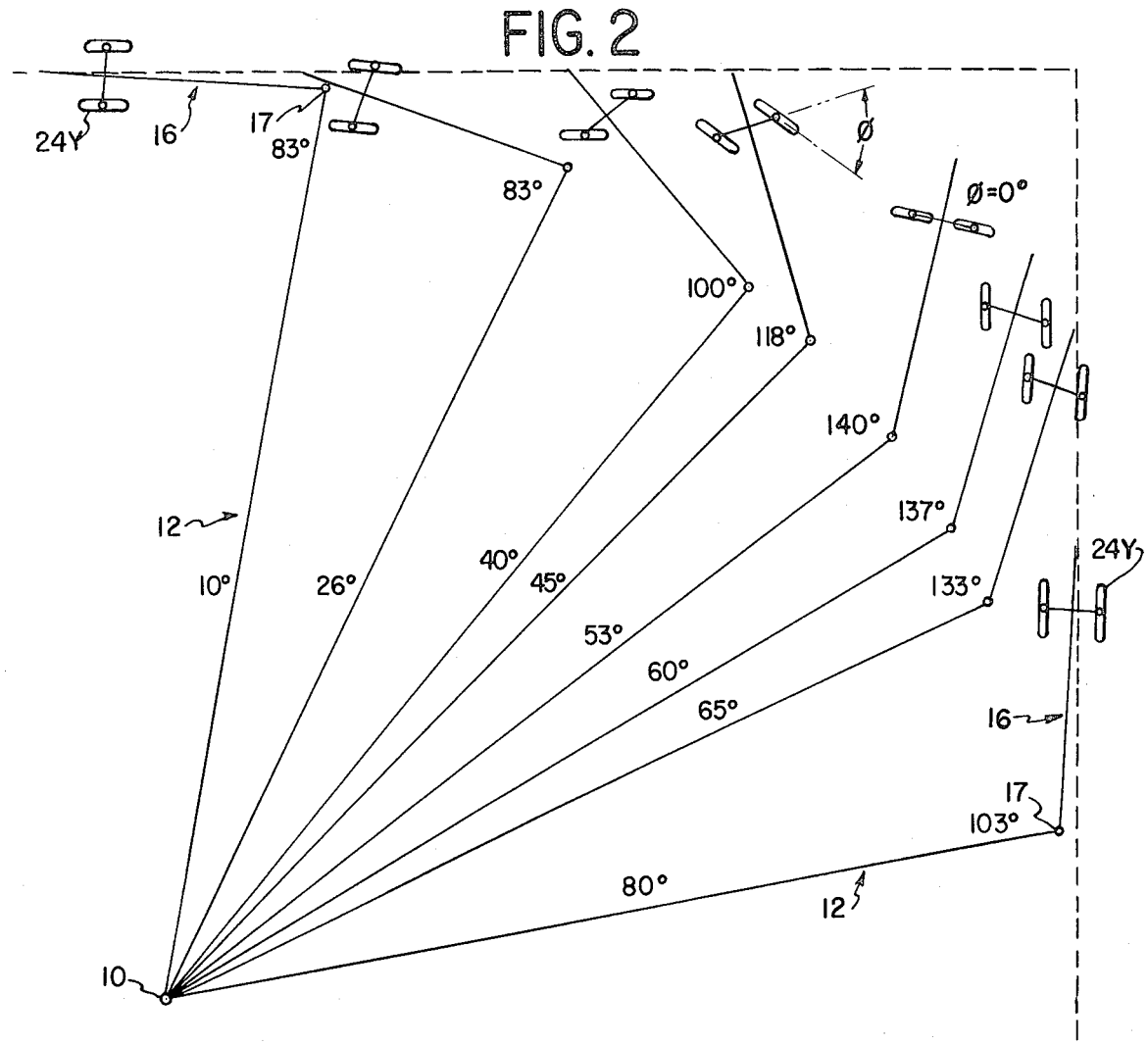
FIG. 2 shows diagrammatically the relative positions of the main arm assembly and extension arm for a representative scan of one quadrant of a field.

In this particular system, it is necessary to determine the direction in which the steering wheels must be aligned for each discreet position of the main arm assembly. This can be done mathematically if the lengths of the respective assemblies and their relative velocities are known. The direction of the extension arm steering wheels 24Y for each discreet position ($\alpha$) of the main arm is in the same direction as the velocity vector required for the outer point of the extension arm 16 relative to the base 10. Hence, this velocity vector is computed for each discreet main arm position and then the encoder wheels (which produce a different digital signal for each main arm position) are properly positioned so as to cause the required control of the steering wheels. By way of example, FIG. 3 shows a workable relationship between the position angle $\alpha$ of the main arm and the steering wheel position angle $\phi$ as indicated in FIG. 2.

Figure 3:
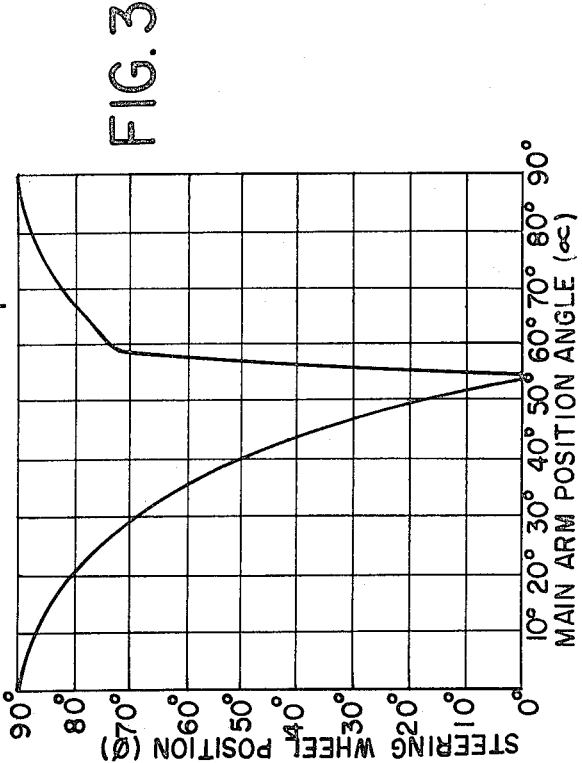
FIG. 3 is a graph showing steering wheel position as a function of the angle of the main arm assembly.

It may appear from FIG. 3 that unusually abrupt changes in steering wheel position are required between $\alpha = 40°$ and $\alpha = 60°$ in view of the movement of the main arm assembly; however, the linear velocity of the outer section of the main arm 12 is very low, for example, in the order of 300 feet per hour. Therefore, for all intents and purposes, the turning of the steering wheels 22Y may be considered to be instantaneous in the sense that the steering wheels are positioned very quickly with respect to the linear velocity of the assembly.

FIGS. 4A, 4B, 5 and 6, show certain mechanical features of a system incorporating the basic invention. The parts illustrated in these figures have been numbered to correspond with FIG. 1. Inasmuch as the construction of the main arm assembly is known, an extended discussion of the physical structure of the system is not included.

Sections 12A,12B...N of the main arm assembly are shown as consisting of hollow conduits through which water is applied to sprinklers 40 spaced along the individual sections. (Alternatively, a separate conduit for the water may be supported in conventional fashion on these sections.) Drive motors 42A, 42B...N are mounted on respective support towers 18A,18B...N to drive the wheels 20A,20B...N which rotate the main arm assembly. As mentioned above, the manner in which these motors are controlled is standard, except that operation of motor 42N is determined by the stress of the section 12N caused by rotation of the extension arm 16.

The outermost main arm section 12N may be coupled to the inner extension arm section 16A by a flexible hose 43 which will permit the required pivoting of extension arm 16 while supplying water to the extension arm sprinklers 44. Support tower 22X for the extension arm section 16X may include a plate 45 in which a pin 46 extending downwardly from section 12N is suitably journaled. Obviously, numerous other satisfactory arrangements can be used to provide the required pivotable movement between these two parts.

Figure 5:
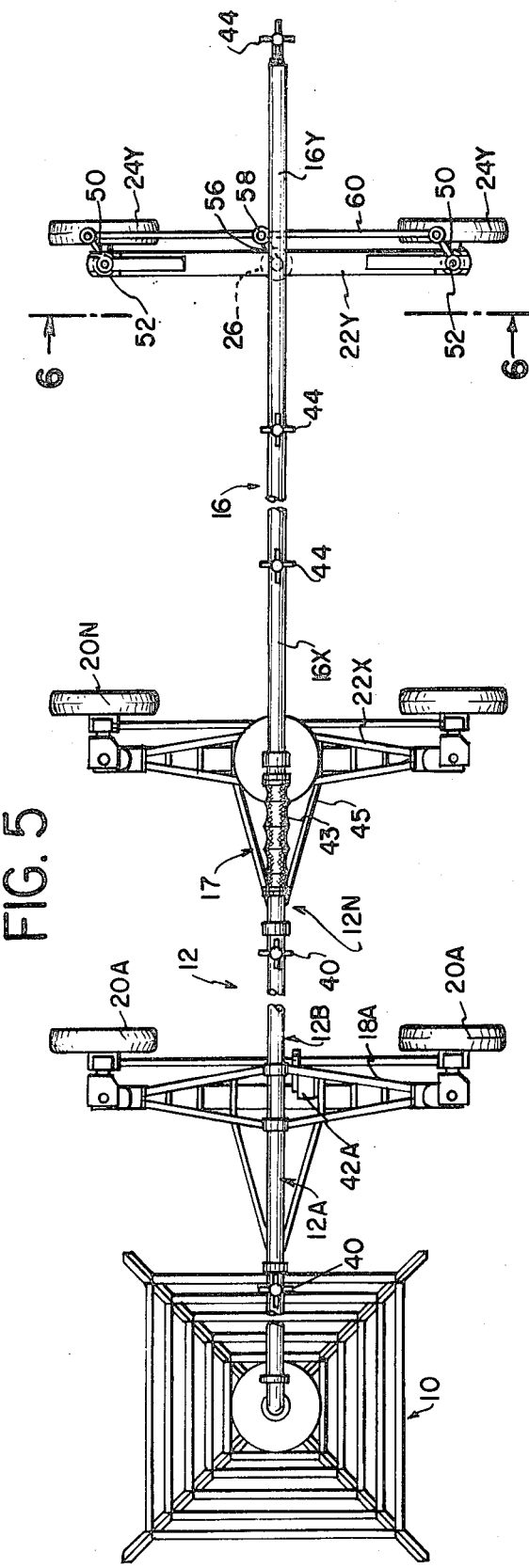
FIG. 5 is a plan view of the main and extension arm assemblies of Application No. 306545.
Figure 6:
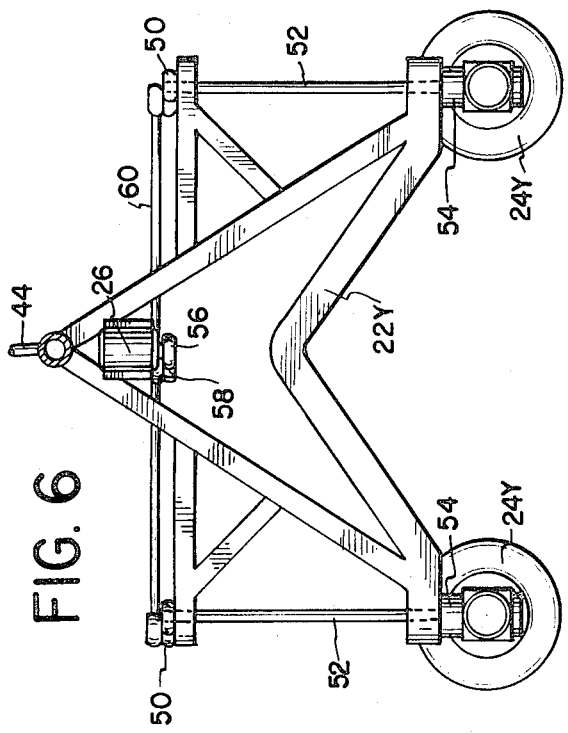
FIG. 6 is a sectional view along the line 6—6 of FIG. 5.

The steering arrangement for the steering wheels 24B is shown most clearly in FIGS. 5 and 6. The steering motor 26 is physically supported on support tower 22Y above the wheels. Motor 26 is a constant speed electrical motor which is turned on and off upon receipt of signals from comparator 34, as described above with reference to FIG. 1. The alignment or position of the steering wheels 22Y is controlled by a pin 50 connected to vertical connecting rods 52 which rotate axle supports 54 on which the wheels are mounted. The physical means for steering the wheels is conventional and, obviously, any suitable arrangement for steering wheels 22Y may be used.

As the assembly sweeps through any quadrant of the field, as explained above, it is necessary that the steering wheels be moved in first one direction so that the extension arm can start to move outwardly, and then back in the other direction so that the extension arm can return to its original position. Consequently, in practice, the steering wheels must be aligned in the same direction on two separate occasions during the sweep of the any given quadrant (i.e. while "coming" and "going"). This creates a redundancy or ambiguity which ordinarily would require the electronic circuits of the comparator to measure the encoded position angle signals in such a way as to be able to determine the direction in which the extension arm is moving relative to the main arm.

According to a further feature of this system, this requirement is avoided by a crank shaft type steering arrangement comprising a rotatable disc 56 which rotates in only one direction in response to the actuation of the steering motor 26. The disc 56 is connected to the pins 50 by means of a link 58 suitably pinned to the edge of disc 56 (see FIG. 6) at 59, the other end of link 58 being connected to pins 50 by horizontal tie rods 60. With this type of arrangement (and proper dimensioning and disposition of the steering mechanism), full rotation of disc 56 causes the steering wheel 22Y to rotate 90° in one direction (corresponding to rotation of disc 56 through 180°) and then back 90° to the starting position (as the disc 56 rotates from 180° to 360°). Consequently, since there is a discreet position of disc 56 for each position of the main arm assembly throughout any given quadrant, there no longer exists the ambiguity referred to above, although the full steering cycle is still available.

A booster pump (not shown) may be associated with the extension arm 16. The booster pump is desirable because the extension arm 16 moves at a higher velocity relative to ground than the main arm assembly 12. To assure uniform irrigation, it may be desirable to provide more water to the sprinklers on the extension arm. The booster pump may be turned off when the extension arm is at right angles to the main arm ($\alpha = 0$) and, if desired, may be operated to provide a variable water pressure at the extension arm sprinklers, depending upon the position of the extension arm. This control may be responsive to the encoded position angle signals in an obvious way. Control of the water pressure at the main arm sprinklers and/or sprinkler spacing may be pursuant to conventional practice.

Figure 7:
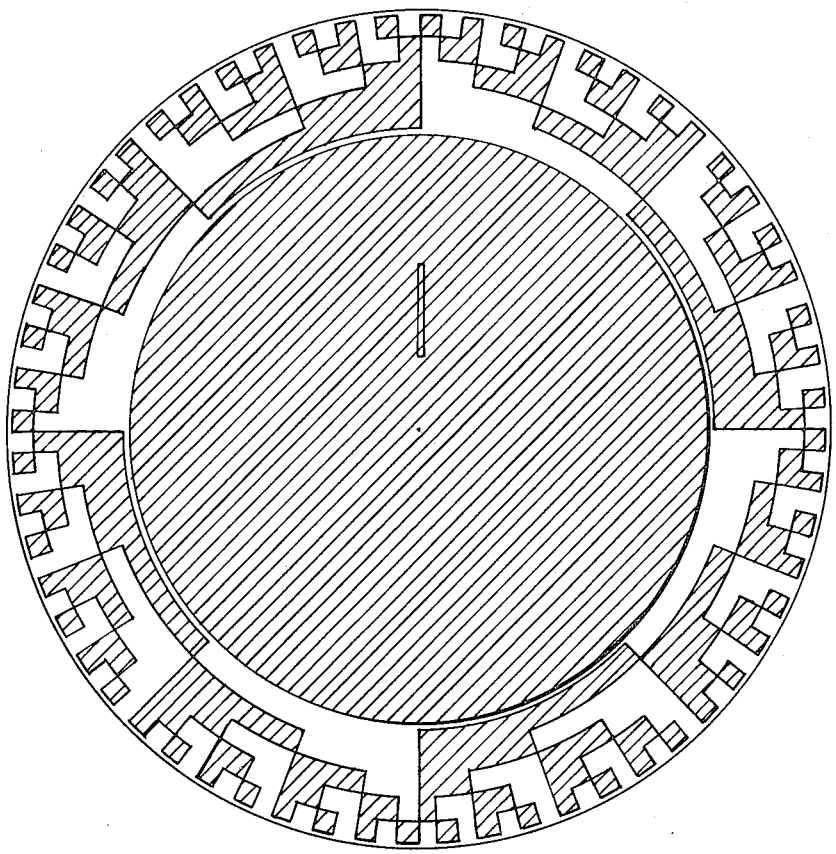
FIG. 7 shows one of the encoding wheels used in the embodiment disclosed in Application No. 306545.

FIG. 7 illustrates an encoding wheel which may be used in accordance with the system as described above. The wheel illustrated in FIG. 7 may be read by photoelectric means, and suitable devices for this purpose are known. A similar wheel may be used as the steering wheel encoder with the physical disposition of the respective wheels being properly adjusted to cause a desired relationahip between the extension arm 16 and the main arm 12 for each discreet position of the main arm.

Figure 8B:
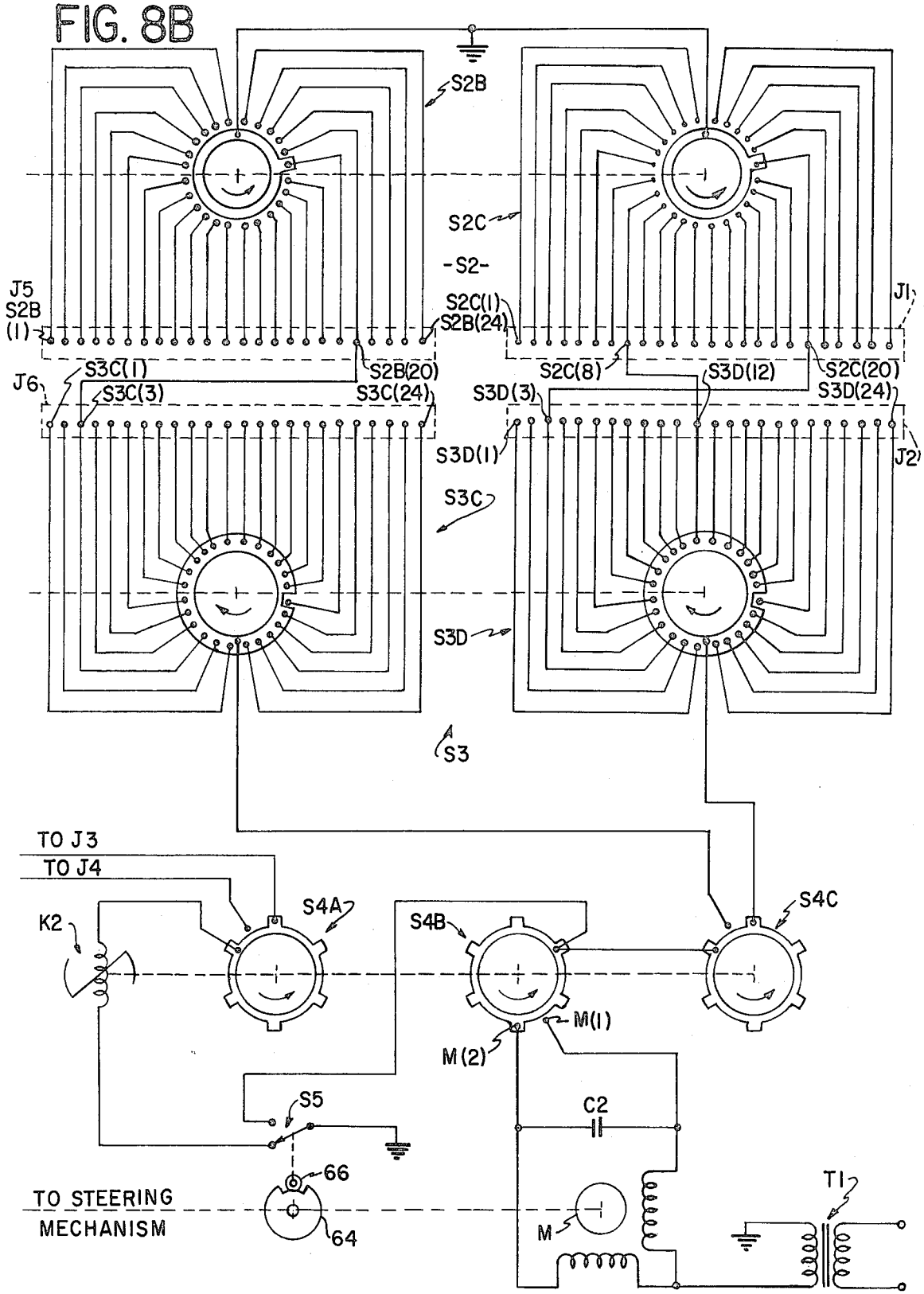

FIGS. 8A and 8B show a schematic diagram for the control circuitry of a second preferred embodiment of the invention. This embodiment is also responsive to the angle $\alpha$, but the angle is not measured directly by the encoding means illustrated in FIG. 1. Instead, in the embodiment of FIGS. 8A and 8B, the angle $\alpha$ is measured by counting the number of rotations of the wheel 20N of the outermost main arm section 12N. Also, as described below, the steering is controlled by a reversible motor for the purpose of moving the steering wheels 24 in one direction and then back in the other. They system of FIGS. 8A and 8B is similar to that of FIG. 1 except that in place of the encoders and electronic comparator circuitry, multi-position rotary switches are used to perform the encoding and comparison functions.

In FIGS. 8A and 8B, the bidirectional motor is shown at M having terminals M(1) and M(2) which may be selectively grounded. Grounding of terminal M(1), for example, causes rotation in a clockwise direction whereas grounding of terminal M(2) will cause rotation in a counterclockwise direction.

In this embodiment, operation is controlled by three banks of rotary switches S2, S3 and S4. The bank S2 includes three twenty-four position rotary switches S2A, S2B and S2C, the armatures of which are controlled by a rotary solenoid K1. Bank S3 includes four twenty-four position rotary switches S3A, S3B, S3C and S3D, the armatures of which are mechanically driven in any suitable fashion by the steering mechanism for the steering wheels 24 of the extension arm assembly.

Bank S4 includes three twelve-position switches S4A, S4B and S4C which, as explained below, function to control the direction of rotation of motor M and are stepped by means of rotary solenoid K2.

As shown in FIGS. 8A and 8B, the armatures are shaped differently to accomplish different switching functions. For example, S3B closes only one of its contacts in any position. S3C closes all but one of its contacts.

In describing the switch banks S1-S4, the stationary contacts of each switch are identified by the legend corresponding to the particular switch and a number in parentheses identifying the stationary contact. Thus, S3A(19) is the nineteenth contact of switch S3A.

In the embodiment of FIGS. 8A and 8B, operation is controlled as a function of the number of rotations of the wheels 20N of the last section 12N of the main arm assembly. Thus, as schematically shown in FIG. 8A, wheel 20N may include a cam 60 which operates a cam follower 62 to actuate switch S1 once for each revolution of the wheel 20N. Under normal conditions, a capacitor C1 is charged by a 28-volt source through resistor R1. Once during each rotation of wheel 20N, switch S1 is actuated by the cam and cam follower 60,62 transferring the charge on capacitor C1 through diode D1 to rotary solenoid K1. Each time solenoid K1 is energized the switch bank S2 is moved one position in a counterclockwise direction.

The stationary contacts of switch S2B are connected by plugboards or matrices J5 and J6 to the stationary contacts of switch S3C. Similarly, the stationary contacts of switch S2C are connected by matrices J1 and J2 to the contacts of switch S3D. The individual contacts are connected by jumpers (not shown in FIG. 8 for purposes of clarity) and, as explained below, the manner in which the contacts are connected programs the operation of the motor M1 required to position the steering wheels 24 in a desired direction for each discrete angular position of the main arm assembly. This programming may, for example, be such as to cause steering wheel position ($\phi$) to vary with angle $\alpha$ as shown in FIG. 3.

For purposes of example, assume contact S2C(20) is connected to contact S3D(3) by jumpers between matrix J1 and matrix J2. With the circuit in the illustrated condition, when switch S2C moves to contact S2C(20), terminal M(1) of motor M is grounded through switches S4B, S4C, S3D and S2C. Consequently, the motor M is energized, for example, in a clockwise direction to initiate the rotation of the steering wheels 24. As motor M rotates, the switch bank S3 is driven and the switches S3A, S3B, S3C and S3D are stepped through their successive positions.

When switch S3D reaches contact S3D(3) in the example being considered, the ground connection to terminal M(1) of motor M as traced above is broken. Consequently, the motor is de-energized and the steering wheels 24 come to rest. In this way, the steering wheel position $\phi$ as determined by the jumper connections between the matrix J1 and matrix J2.

When wheel 20N completes a second revolution, the system operates in the same way as described to step S2C to contact S2C(21) to again energize motor M until switch S3D has been stepped to the contact which is electrically connected to contact S2C(21) through the matrices J1,J2.

When it is necessary to reverse the direction of rotation of the motor to cause steering of the wheels in a counterclockwise direction the motor M1 is placed under the control of the switches S2B and S3C by means of the switch bank S4.

Switch S4A has a contact S4A(1) connected to contact S3B(25). Contact S4A(2) is connected to contact S3A(25). The rotary solenoid K2 is connected to the armature of switch S4A. As with the cases of switches S2B, S2C and S3C, S3D, the contacts of switch S3A and S3B are brought to matrices J4 and J3, respectively, so that any desired one of their 24 contacts may be connected to the output terminal 25.

For example, assume that the contact S3B(24) has been connected to contact S3B(25). Switches S3A and S3B are actuated with switches S3C and S3D as motor M rotates as described above. As switch S3B is stepped through contacts S3B(1) through S3B(23) there is no effect on the system operation. However, when contact S3B(24) is closed, solenoid K2 is energized through switch S4A and switch S3B by the 29-volt d.c. source which is coupled to the armatures of switches S3A and S3B. When switch S5 is in its illustrated position (the function of this switch is described below), solenoid K2 is energized to step the switches S4A, S4B and S4C one position, for example, in a counterclockwise direction. The effect of this is to connect the terminal M(2) of motor M to contact S4C(2), which in turn is connected to the armature of the switch S3C. Consequently, as wheel 20N continues to rotate, the motor M1 is controlled by the switches S2B and S3C in the same manner as described above with respect to switches S2C and S3D except, of course, that motor M now rotates in a clockwise direction. In this situation, when switch S3A is rotated so that its armature contacts the contact which is connected to contact S3A(25) through the matrix J4, the solenoid K2 again is energized stepping the switches S4 one position in a counterclockwise direction and returning the circuit to the illustrated condition.

The switch S5, mentioned briefly above, is under the control of a cam 64 which rotates with the rotor of motor M to drive a cam follower 66 which actuates the switch. A suitable gear train is used to cause a 24-to-1 stepdown ratio between the cam 64 and the switch bank S3. Consequently, as the armatures of switch bank S3 rotate between any two successive stationary contacts, the cam 64 makes one complete revolution. During this entire revolution of cam 64 (except for the illustrated position), the cam 66 biases the switch S5 so as to ground the armature of switch S4B and switch S4C. This means that the motor M cannot come to rest regardless of the positions of switches S3C (or S3D) until the cam 64 has rotated to its illustrated position. This position and the operation of the cam and cam follower 64 and 66, respectively, can be adjusted to ensure that the switches S3A, B, C and D are precisely centered on each of their respective stationary contacts. Thus, in a sense, cam 64 and cam follower 66 together with the switch S5 function as a precise switch adjustment to prevent any loss of synchronism.

A switch S6 coupled to a 28-volt d.c. source in conjunction with the switch S2A may be used to manually energize the stepping solenoid K1 so that the system can be brought to an initial set position.

What is claimed is:

1. Irrigating apparatus for supplying water to a non-circular area, comprising a rotatable main arm assembly for supplying water to a circular portion of said area, an extension arm assembly rotatably mounted at the free end of said main arm assembly for supplying water to portions of said area outside of said circular portion, said main arm assembly and said extension arm assembly being supported on towers having wheels, at least one of the support towers for said extension arm assembly having steerable wheels, steering means responsive to the angular position of the main arm assembly relative to said area for changing the direction of said steerable wheels to thereby rotate said extension arm assembly relative to said main arm assembly, said steering means comprising a first multiposition switch means responsive to said angular position of said main arm assembly, a second multiposition switch means responsive to the position of the steering wheels, and a motor for driving said steerable wheels connected in an energizing circuit including said first and second multiposition switch means.

2. Irrigating apparatus according to claim 1, wherein said first multi-position switch means is actuated by rotation of at least one of the wheels of a tower supporting said main arm assembly.

3. Irrigating apparatus according to claim 1, wherein said motor is a reversible motor and wherein each of said multiposition switch means comprises at least two rotary switches for respectively driving the motor in clockwise and counter-clockwise directions.

4. Irrigating apparatus according to claim 3, including two further multi-position rotary switches responsive to the position of the steerable wheels for determining the direction of rotation of said steering motor depending upon the position of the steerable wheels.

* * * * *